United States Patent [19]
Harrison et al.

[11] 3,883,812
[45] May 13, 1975

[54] DIODE-QUAD BRIDGE CIRCUIT MEANS

[75] Inventors: Dean R. Harrison, Sunnyvale; John Dimeff, San Jose, both of Calif.

[73] Assignee: The United States of America as represented by the National Aeronautics and Space Administration Office of General Counsel-Code GP, Washington, D.C.

[22] Filed: Jan. 16, 1974

[21] Appl. No.: 433,968

Related U.S. Application Data

[63] Continuation-in-part of Ser. No. 209,618, Dec. 20, 1971, abandoned.

[52] U.S. Cl. ........... 329/166; 307/321; 324/DIG. 1; 329/204
[51] Int. Cl. ................. H03d 1/10; H03k 17/56
[58] Field of Search ........... 329/166, 204; 307/321; 324/DIG. 1; 332/47

[56] References Cited
UNITED STATES PATENTS

2,955,266  10/1960  Glasspool .................... 332/47
3,047,746  7/1962   Berkery ...................... 307/321 X
3,688,206  8/1972   Eide ......................... 329/204

*Primary Examiner*—Alfred L. Brody
*Attorney, Agent, or Firm*—Darrell G. Brekke; Armand G. Morin, Sr.; John R. Manning

[57] ABSTRACT

Diode-quad bridge circuit means for use as a transducer circuit or as a discriminator circuit and including a diode bridge having first, second, third and fourth bridge terminals consecutively coupled together by four diodes polarized in circulating relationship, a first impedance connected between the second bridge terminal and a circuit ground, a second impedance connected between the fourth bridge terminal and the circuit ground, a signal source having a first source terminal capacitively coupled to the first and third bridge terminals and a second source terminal connected to the circuit ground, and an output terminal coupled to the first bridge terminal and at which an output signal may be taken.

10 Claims, 9 Drawing Figures

PATENTED MAY 13 1975   3,883,812
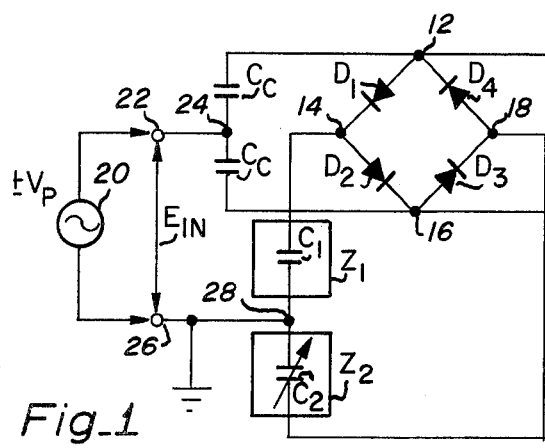
Fig_1
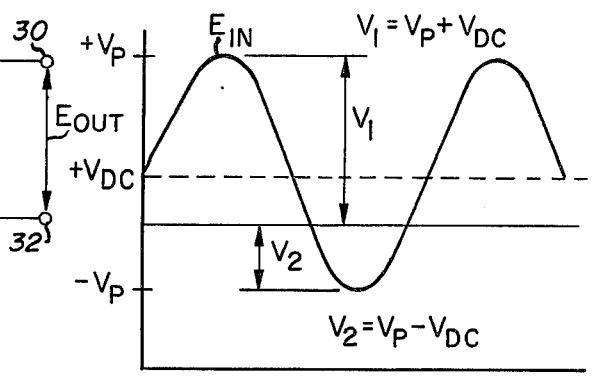
Fig_2
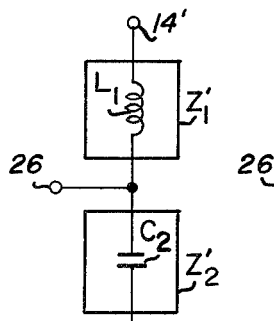
Fig_3
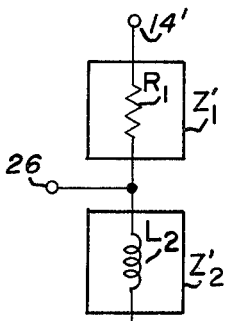
Fig_4
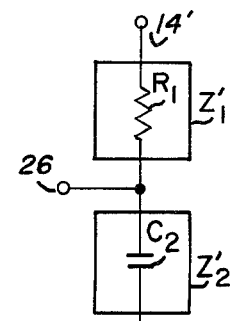
Fig_5
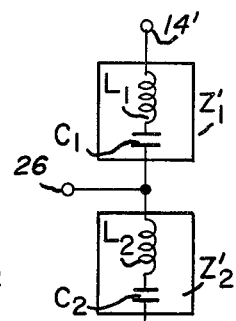
Fig_6
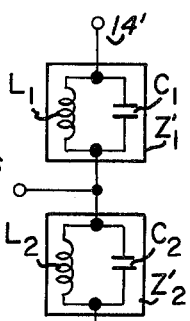
Fig_7
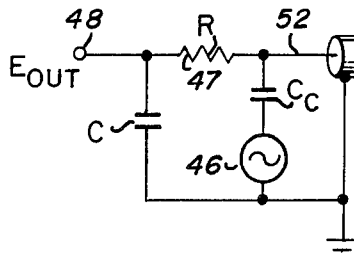
Fig_8
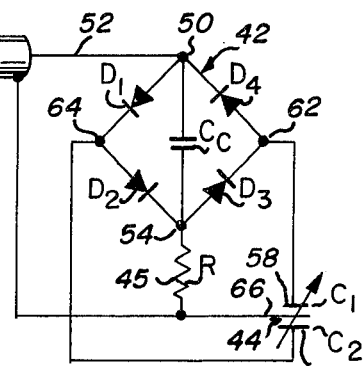
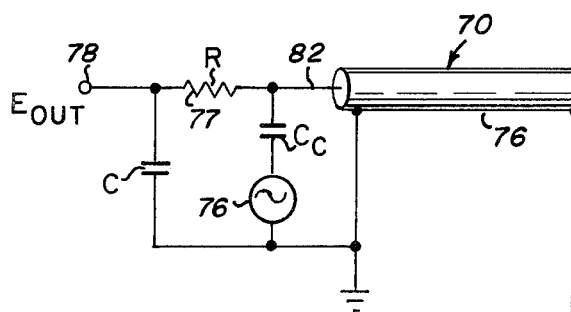
Fig_9
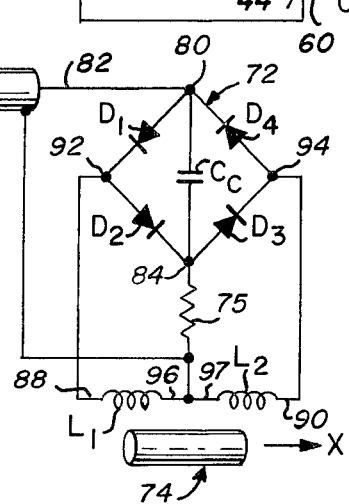

3,883,812

DIODE-QUAD BRIDGE CIRCUIT MEANS

The invention described herein was made by employees of the United States Government and may be manufactured and used by or for the Government for governmental purposes without the payment of any royalties thereon or therefor.

This application is a continuation-in-part of application Ser. No. 209,618 filed Dec. 20, 1971, now abandoned, and the content of that application is expressly incorporated herein by reference.

BACKGROUND OF THE INVENTION

1. Field of the Invention

The present invention relates generally to electrical measuring apparatus and more particularly to diode-quad bridge circuit means for use as transducer and discriminator circuits, such circuit means utilizing a four-terminal circulating diode bridge in combination with various impedance elements to produce an output signal (in transducer applications) which is proportional to a relationship between at least two of the impedance elements or to produce an output signal (in discriminator applications) which is proportional to the input signal frequency.

2. Description of the Prior Art

Certain types of circuit apparatus can be used in both transducer applications and frequency discriminator applications. Where one of these types of circuits is utilized as a transducer circuit, the frequency of the energizing signal is usually maintained constant, and the value of one or more of the impedance elements is varied to produce an output. Where the circuit is used as a discriminator circuit, the impedances of the various impedance elements are usually held constant and the input frequency is varied to produce an output. In the former case, the output signal is proportional to an impedance change from a reference value, while in the latter case, the output signal is proportional to the frequency of the input signal.

Heretofore, many type prior art transducer-discriminator circuits have utilized impedance bridges wherein diodes form two arms of the bridge, and capacitors and/or resistors form the other two arms. In such circuits, the resistors serve as discharge elements for the capacitors following each changing cycle. Examples of such circuits may be found in the U.S. Pat. Nos. to Mayes, 2,929,020; Lion, 3,012,192; Lion, 3,260,934; Lode, 3,271,669; Lode, 3,318,153; and Harrison et al., 3,545,275.

Among the disadvantages of such prior art circuits are that the sensitivities of the circuits usually depend upon the characteristics of the non-varied impedance element and upon the waveform of the energizing signal source; the circuit is usually frequency dependent; and the source impedance of the circuit is usually determined, at least in part, by the values of the resistors. Another disadvantage of such circuits is that at least three leads or conductors are required in order to energize the circuit and obtain an output circuit therefrom. Yet another disadvantage of certain prior art circuits is that the transducer elements cannot be conveniently grounded.

SUMMARY OF THE INVENTION

The principal objectives of the present invention are to provide a diode-quad transducer/discriminator bridge circuit that generates an accurate output voltage for a static or dynamic change in impedance or frequency over a wide temperature range using a minimum of circuit components; that is substantially more sensitive than prior art circuits; that can be both energized and have its output taken through a single paid of conductors; and that allows for convenient grounding of the transducer elements.

Briefly, a preferred embodiment of a circuit in accordance with the present invention is comprised of a diode bridge having first, second, third and fourth bridge terminals consecutively coupled together by four diodes polarized in circulating relationship, a first impedance connected between the second bridge terminal and a circuit ground, a second impedance connected between the fourth bridge terminal and the circuit ground, a signal source having a first source terminal capacitively coupled to the first and third bridge terminals and a second source terminal connected to the circuit ground, and an output terminal coupled to the first bridge terminal and at which an output signal may be taken.

Advantages of the present invention will become apparent to those or ordinary skill in the art after having read the following detailed description of the preferred embodiments shich are illustrated in the several figures of the drawings.

IN THE DRAWINGS

FIG. 1 is a schematic diagram illustrating a simplified diode-quad bridge circuit embodying the basic principles of the present invention;

FIG. 2 is a diagram illustrating the operational characteristics of the bridge circuit shown in FIG. 1;

FIGS. 3 through 7 are schematic diagrams illustrating alternative embodiments of impedance sub-circuits which may be incorporated into the illustrated preferred embodiments;

FIGS. 8 and 9 are schematic diagrams illustrating diode-quad bridge circuits in accordance with the present invention wherein a single pair of conductors are utilized as means for conveying excitation current to remote transducer elements and extracting an output signal therefrom.

DETAILED DESCRIPTION OF THE PREFERRED EMBODIMENT

Referring now to FIG. 1 of the drawings, a simplified embodiment of a diode-quad bridge circuit in accordance with the present invention is illustrated which can be used as a universal impedance bridge transducer circuit for developing a DC output signal proportional to the change in impedance of a variable impedance transducer element. Suitable transducer elements include pressure sensitive capacitive devices, liquid-level measuring devices, proximity deflection sensors, inductive displacement sensors and other similar devices. By substituting the impedance elements $Z_1'$ and $Z_2'$ of FIGS. 3–7 for the impedance elements $Z_1$ and $Z_2$, the circuit can also be used as an FM discriminator circuit for developing a change in output voltage proportional to a change in input frequency.

The circuit illustrated in FIG. 1 includes a four-terminal diode bridge 10 having terminals 12, 14, 16 and 18 consecutively coupled together by four diodes $D_1$, $D_2$, $D_3$ and $D_4$. The diodes $D_1$–$D_4$ are polarized in current circulating relationship to form a bridge circuit generally referred to as a circulating "diode-quad."

Connected in series between the bridge terminals 12 and 16 are a pair of coupling capacitors $C_c$ which are preferably matched and of a value which is much greater than $C_1$ or $C_2$. Connected in series between the bridge terminals 14 and 18 is a first impedance element $Z_1$, which may include a fixed capacitor $C_1$ as illustrated, and a second impedance element $Z_2$, which may include a variable capacitor $C_2$ as illustrated. Where the circuit is used as a transducer circuit, the variable capacitor $C_2$ comprises the operative portion of a capacitive transducer, the physical embodiment of which depends upon the particular application. The capacitor $C_1$ is typically chosen to have a capacitance near the mid-range value of capacitor $C_2$. Alternatively, capacitor $C_1$ could be the variable element, or both $C_1$ and $C_2$ can be varied in a differential manner to produce differentially varying capacitances.

For energizing the circuit with an alternating input signal $E_{in}$, a signal source 20 is coupled between a first input terminal 22, which is connected to a circuit junction 24 between the commonly connected plates of capacitors $C_c$, and a second input terminal 26 which is connected to a circuit junction 28 between the commonly connected plates of capacitor $C_1$ and capacitor $C_2$. Signal source 20 may be any source of alternating electrical energy capable of providing a signal of alternating polarity ($\pm V_p$). A first output terminal 30 is coupled to bridge terminal 12 and a second output terminal 32 is coupled to bridge terminal 16.

The operation of the circuit can be most easily understood by considering the diodes $D_1$–$D_4$ as switches that are switched in sequence by an input signal voltage such as that shown in FIG. 2. This figure represents a sinusoidal excitation voltage $E_{in}$ and a positive DC output signal present on terminal 30. (On terminal 32 a similar voltage condition exists except that the DC voltage is negative.) Assuming that the capacitance of coupling capacitors $C_c$ are much larger than the capacitances of $C_1$ and $C_2$ and that the circuit is unloaded, when the applied voltage is sufficient to produce a forward bias condition, diode $D_1$ conducts, charging capacitor $C_1$ to peak value of $V_1$ and removing a quantity of charge of $C_c$ equal to $V_1 C_1$.

As the applied voltage decreases sufficiently, $D_1$ is turned off, then as diode $D_4$ becomes forward biased relative to the voltage on $C_2$, it is turned on, thereby charging $C_2$ to the peak value of $V_2$ and replacing a quantity of charge on $C_c$ equal to $V_2 C_2$. As a result, it appears as though a differential charge exists on $C_c$ that is proportional to the difference of the charges on $C_1$ and $C_2$. However, for steady-state conditions, the net transfer of charge from $C_c$ is zero. Since the DC voltage component on $C_c$ must then adjust to a level to satisfy the condition, that $Q_1 = Q_2$, $$V_1 C_1 = V_2 C_2 \qquad (1)$$

The actual charges will be slightly less than is suggested by equation (1) due to the forward voltage drop of the diodes, $V_d$. By substituting $V_1 = V_p + V_{DC} - V_d$ and $V_2 = V_p - V_{DC} - V_d$ into Equ. (1), simple algebra yields the circuit output normalized to the input voltage as $$V_{DC}/(V_p - V_d)|_{30} = -(C_1 - C_2)/(C_1 + C_2) \qquad (2)$$

at terminal 30. It is assumed that $V_{d_1} = V_{d_2}$, etc.

Since the voltage developed at terminal 32 is $$V_{DC}/(V_p - V_d)|_{32} = +(C_1 - C_2)/(C_1 + C_2) \qquad (3)$$

then the voltage between terminals 30 and 32 is $$V_{DC}/(V_p - V_d)|_{30-32} = 2(C_1 - C_2)/(C_1 + C_2) \qquad (4)$$

By differentiating Eq. (4), the output voltage for changes in capacitance can be computed. However, it is more meaningful to compute the sensitivity factor, as defined in Eq. (5) for comparison with other similar circuits.

$$S_C^V = (dV_o/V_{in})/(dC/C_o) \qquad (5)$$

wherein $C_o$ denotes evaluation at balance condition, i.e., where $C_1 = C_2 = C_o$.

This normalized expression is independent of the level of excitation voltage (as long as the input peak voltage is much greater than the diode voltage drop) and the fractional change produced in the capacitance. The result of computing the sensitivity factor for this circuit reveals the following significant facts: (1) the sensitivity factor is 1.0; (2) the sensitivity is independent of the circuit configuration and circuit elements, and (3) for the case of capacitance transducers, the sensitivity is independent of the excitation frequency and waveform.

Among the advantages of the present circuit are that: (a) the transducer element $C_2$ is conveniently grounded, (b) the output can be taken differentially across terminals 30 and 32 (for better common mode rejection of the carrier) or single-ended by grounding terminal 32 through an impedance, and that (c) as will be shown hereinafter, the output data signal $E_{out}$ and the excitation voltage can exist on a single coaxial cable which is convenient for remote measurements.

Upon examining the voltage transfer function, Eq. (4), for the present circuit, it is apparent that if capacitors $C_1$ and $C_2$ are nearly equal, the case for normal usage, and have identical temperature coefficients, a temperature change will produce the factor $(1 + \Delta C/C)$ common to each term and will, therefore, be self-canceling. At or near the balance condition, the calculated contribution of the diodes $D_1$–$D_4$ to the DC output voltage is $$\Delta V_{DC} = \tfrac{1}{2}[(V_{d1} - V_{d2}) - (V_{d3} - V_{d4})] \qquad (6)$$

which suggests the need for temperature tracking at least by pairs and preferably by all four diodes. In the experimental tests the the circuit included a commercially available diode-quad assembly with a temperature tracking specification of $\Delta V_d < 5.0$ mv for $-55°C < T < 100°C$.

Normalizing the output voltage with respect to the excitation voltage (Eq. (4)) to show the performance of the circuit tends to obscure the influence of the excitation voltage on the circuit performance. First it should be clear that if there is a 1 percent change in the amplitude of the excitation voltage, that there will be a corresponding 1 percent change in the output voltage level. Second, it makes little difference in the performance of the circuit when used with capacitance transducer elements if the excitation waveform is sinusoidal, sawtooth, triangular, square, rectangular or whether it has a symmetrical or an unsymmetrical duty cycle. This characteristic can be an important factor in many applications where sine waves are inconvenient and square waves, clock pulses or other vaveforms already exist.

The source impedance of the circuit was determined experimentally at a frequency $f_e$ of 1.0 MHz ($C_1 = C_2 = 115$ pF and $C_c = 0.018$ $\mu$F) and is given by the following approximation $$Z_s = 2 X_{C_2} \qquad (7)$$

where $X_{C_2}$ is the reactance of $C_1$ or $C_2$. This indicates that high values will occur at low values of excitation frequency $f_e$, and thereby set a limit either to the load or to the lowest value of $f_e$ practical for a particular load.

The response time of the circuit is limited by the combination of the source impedance and the coupling capacitors. The response to a step change in capacitance for no load is given by the following equation $$V_s(t) = V_{DC}(1 - e^{-t/ZsC}) \qquad (8)$$

where $C = \frac{1}{2}(C_c + C_{cable})$ and $Z_s$ is given by Eq. (7). Equation (8) indicates that for fast time response $C_c$ must be kept small and yet large enough that $C_c >> C_2$ to prevent a reduction in sensitivity.

Furthermore, by considering the transducer element and the diode-quad as the signal source with a source impedance, $Z_s$, it was experimentally verified that the signal cutoff frequency, $f_{sco}$, for the differential output is given by $$f_{sco} = (C_2/C_c)f_e \qquad (9)$$

For the single-ended output where the junction of the coupling capacitor and the diode-quad is grounded through a high-Q RF choke, the cutoff frequency is one-half of that for the differential circuit. The reason that the RF choke and excitation source combine to short out the lower coupling capacitor to the signal source. In the case of the differential output both coupling capacitors are essentially in series across the signal source. Thus, for the single-ended circuit there will be a factor of 2 increase in the capacitive load to the signal source and the cutoff frequency will decrease accordingly. Various single-ended embodiments are shown in the above referenced co-pending application.

Where the two impedance elements $Z_1$ and $Z_2$ in the bridge are both capacitors (or inductors), a change in the input frequency will cause equal reactance changes in the capacitors and the bridge will remain balanced. Thus, the circuit will not act as a discriminator when both bridge elements are capacitors or inductors (or resistors). In order to use the circuit as a discriminator, impedance elements are needed that will be "frequency selective" when the input frequency (frequency of generator 20) is altered.

Referring now to FIGS. 3–7, for simplicity a plurality of alternative impedance sub-circuits are shown each of which include various combinations of impedance elements $Z_1'$ and $Z_2'$ that can be substituted for the capacitive impedance elements shown in FIG. 1 to provide diode-quad bridge circuits suitable for use as frequency discriminators. For clarity, the three circuit connection points are designated 14', 18' and 26' to indicate correspondence with the link numbered circuit points in FIG. 1.

In the impedance sub-circuit of FIG. 3 the impedance element $Z_1'$ is comprised of an inductor $L_1$ and the impedance element $Z_2'$ is comprised of a capacitor $C_2$. By substituting this impedance sub-circuit for the $Z_1$-$Z_2$ sub-circuit of FIG. 1, the circuit may be used as a single-tuned L-C discriminator.

In the impedance sub-circuit of FIG. 4 the impedance element $Z_1'$ is comprised of a resistor $R_1$ and the impedance element $Z_2'$ is comprised of an inductor $L_2$. By substituting this impedance sub-circuit for the $Z_1$-$Z_2$ sub-circuit of FIG. 1 the circuit may be used as an R-L discriminator.

In the impedance sub-circuit of FIG. 5 the impedance element $Z_1'$ is comprised of a resistor $R_1$ and the impedance element $Z_2'$ is comprised of a capacitor $C_2$. By substituting this impedance sub-circuit for the $Z_1$-$Z_2$ sub circuit of FIG. 1, the circuit may be used as an R-C discriminator.

The impedance element $Z_1'$ in the sub-circuit of FIG. 6 includes a series connected inductor $L_1$ and capacitor $C_1$, and the impedance element $Z_2'$ includes a series connected inductor $L_2$ and capacitor $C_2$. With this sub-circuit substituted into the circuit of FIG. 1, the circuit may be used as a double-tuned series frequency discriminator.

The impedance element $Z_1'$ of the sub-circuit of FIG. 7 includes a parallel connected inductor $L_1$ and capacitor $C_1$, and the impedance element $Z_2'$ includes a parallel connected inductor $L_2$ and capacitor $C_2$. With this sub-circuit substituted into the circuit of FIG. 1, the circuit may be used as a double-tuned parallel frequency discriminator.

Circuits modified to include the sub-circuits of FIGS. 3–7 produce an output voltage which varies substantially linearly with changes of input frequency about a center frequency and over a particular range of frequencies. The slope characteristic or sensitivity for both the double-tuned series and parallel circuits is controllable by varying either the tuned circuit Q's of the separation of the resonant frequencies of the two tuned circuits.

An interesting property of the diode-quad discriminator characteristics is that, in general, for input frequencies that are in either saturation region, the output voltage remains at that saturated level until the frequency is brought back into the unsaturated region. By observing the polarity of the DC output, it can be immediately determined whether the incoming frequency is above or below the center frequency of the discriminator.

The circuit is also capable of measuring differences in resistances to provide a universal impedance bridge. That is, by adjusting the input frequency, the unknown impedance, one of the impedance elements $Z_1$ or $Z_2$, can be brought into balance with a known resistance forming the other impedance element. An alternative method would be to hold the frequency constant and vary the resistance to bring about a balance condition with the unknown. The accuracy in determining the absolute value of capacitance or inductance decreases as the losses become more significant. This effect is produced by switching sequence of the diodes. This sequence prevents interaction of the two branches which means that the charge removal on the coupling capacitor will be related to only the magnitude of the impedance and not its phase. Thus, a variable resistance in one half of the bridge can balance out the magnitude of an impedance in the other half of the bridge, whether it consists of R, L, C, or any combination thereof.

By observing the direction of the output voltage as the frequency is changed, it can be determined whether the unknown is capacitive or inductive. Furthermore, a measure of the slope of the output ($\Delta v/\Delta f$) provides an indirect measurement of the losses in the unknown branch. It should be understood that small losses ($R^2 << X^2_L$) will not produce a noticeable change in the slope. However, taking this limitation into consideration, the information that can be determined from the circuit measurements include the Q, the type of reactance, and the magnitude of the impedance which is sufficient information for universal impedance measurements.

In the basic circuit shown in FIG. 1 at least three leads are reuired to energize the circuit and obtain an output signal therefrom. However, in FIGS. 8 and 9 modifications of the basic circuit are illustrated which are arranged so that a single co-axial cable may be used to both excite the transducer circuit and extract an output signal therefrom. In the embodiment shown in FIG. 8, a first sub-circuit is provided at the remote end of cable 40 including a circulating diode bridge 42, a coupling capacitor $C_c$, a resistor 45, and a differential capacitor 44. At the other end of cable 40 a second sub-circuit is provided including a signal source 46, a coupling capacitor $C_c$, a resistor 47, a capacitor C, and an output terminal 48.

More specifically, the bridge terminal 50 is connected to one end of the inner conductor 52 of cable 40 while bridge terminal 54 is coupled through the resistor 45 to the outer conductor 56 of cable 40. The outer plates 58 and 60 of differential capacitor 44 are connected to the bridge terminals 62 and 64 respectively, while the inner plate 66 is coupled to outer conductor 56. The capacitance between plate 58 and plate 66 develops a capacitance $C_1$, while the capacitance between plates 60 and 66 develops a capacitance $C_2$. The coupling capacitor $C_c$ is connected between bridge terminals 50 and 54.

At the other end of cable 40, the coupling capacitor $C_c$ and signal source 46 form a series circuit between the other end of inner conductor 52 and the outer conductor 56 (circuit ground). Output terminal 48 is coupled to inner conductor 52 through the resistor 47 and is coupled to outer conductor 56 by capacitor C.

In operation, the circuit of FIG. 8 operates identically in theory and practice to that explained above with reference to the FIG. 1 embodiment where a single ended output circuit is connected across terminals 30 and 32. Although in the FIG. 1 embodiment, the excitation voltage is coupled to the diode-quad through both of the coupling capacitors $C_c$, the performance of the circuit is unaffected if one of the coupling capacitors $C_c$ is connected across the terminals 12 and 16 (in FIG. 8, terminals 50 and 54) instead of 24 and 16 since $C_c$ continues to function as a means for coupling the excitation voltage to the lower terminal of the diode-quad.

In the alternative embodiment shown in FIG. 9, a first sub-circuit is provided at the remote end of cable 70 including a circulating diode bridge 72, a coupling capacitor $C_c$, a resistor 75, and a variable differential inductor 74 comprised of windings $L_1$ and $L_2$ and a moveable iron core. At the other end of cable 70 a second sub-circuit is provided including a signal source 76, a coupling capacitor $C_c$, a resistor 77, a capacitor C, and an output terminal 78.

The bridge terminal 80 is connected to one end of the inner conductor 82 of cable 70 while bridge terminal 84 is coupled through the resistor 75 to the outer conductor 86 of cable 70. The opposite ends 88 and 90 of the windings of differential inductor 74 are connected to the bridge terminals 92 and 94 respectively, while the commonly connected ends 96 and 97 are connected to outer conductor 86 of cable 70. In the preferred embodiment the differential inductor 74 is a variable-differential-transformer (LVDT) type displacement transducer. The application of the LVDT to the circuit is accomplished by connecting the two secondary windings in the circuit as illustrated to function as two differential inductors $L_1$ and $L_2$. The coupling capacitor $C_c$ is connected between bridge terminals 80 and 84.

At the other end of cable 70 the coupling capacitor $C_c$ and signal source 76 form a series circuit between the other end of inner conductor 82 and the outer conductor 86 (circuit ground). Output terminal 78 is coupled to inner conductor 82 through the resistor 77 and is coupled to outer conductor 86 by capacitor C.

In operation, the circuit of FIG. 9 operates similar in theory and practice to that of FIG. 8.

Among the advantages of the present invention over the prior art are that the circuit output is independent of frequency; the circuit output is independent of waveform so long as symmetry exists; no purely resistive elements are needed in the capacitive transducer circuits; circuits provided in accordance with the present invention are up to twice as sensitive as prior art circuits; the low source impedance produces extremely low noise outputs of less than 2 microvolts peak-to-peak; and the circuits can be used for either R, L, or C type transducer, or for frequency discriminator applications with little, if any, modification.

Although the above discription has been directed to several preferred embodiments which are shown in simplified form, it is contemplated that many modifications will become apparent to those of ordinary skill in the art after having read this disclosure. It is therefore to be understood that the description is by way of illustration only, and is in no manner to be taken as limiting. Accordingly, it is intended that the appended claims be interpreted as covering all modifications which fall within the true spirit and scope of the invention.

What is claimed is:

1. Diode-quad bridge circuit means comprising:
   a diode bridge including first, second, third and fourth bridge terminals consecutively coupled together by four diodes polarized in circulating relationship;
   a coaxial cable including an inner conductor and an outer conductor, one end of said inner conductor being coupled to said first bridge terminal, and one end of said outer conductor being coupled to said third bridge terminal;
   a signal source for developing a signal of balanced alternating polarity, said signal source having a first source terminal coupled to the other end of said outer conductor, and a second source terminal;

a first coupling capacitor coupling said second source terminal to the other end of said inner conductor;

a second coupling capacitor coupling said first bridge terminal to said third bridge terminal;

a first impedance means connected between said second bridge terminal and said one end of said outer conductor;

a second impedance means connected between said fourth bridge terminal and said one end of said outer conductor; and an output terminal coupled to said other end of said inner conductor whereby the voltage developed between said output terminal and said first source terminal is proportional to the difference of the impedances of said first impedance means and said second impedance means divided by the sum of the impedances of said first impedance means and said second impedance means.

2. Diode-quad bridge circuit means as recited in claim 1 wherein said first and second impedance means are respectively comprised of the capacitive portions of a differential capacitor.

3. Diode-quad bridge circuit means as recited in claim 2 and further including a resistor coupling said output terminal to said other end of inner conductor, and a third capacitor coupling said output terminal to said first source terminal.

4. Diode-quad bridge circuit means as recited in claim 1 wherein said first and second impedance means are comprised of the respective inductive windings of a differential inductor transducer.

5. Diode-quad bridge circuit means as recited in claim 4 and further including a resistor coupling said output terminal to said other end of inner conductor, and a third capacitor coupling said output terminal to said first source terminal.

6. Diode-quad bridge circuit means, comprising:

first and second conductors;

a first sub-circuit including a diode bridge having first, second, third and fourth bridge terminals consecutively connected together by four diodes polarized in circulating relationship, said first bridge terminal being connected to one end of said first conductor, a first coupling capacitor coupled across said first and third bridge terminals;

a first impedance means connected between said second bridge terminal and one end of said second conductor, and a second impedance means connected between said third bridge terminal and said one end of said second conductor; and a second sub-circuit including a signal source for developing a signal of balanced alternating polarity, said signal source having a first source terminal connected to the other end of said second conductor, and a second source terminal, a second coupling capacitor coupling said second source terminal to the other end of said first conductor, and means forming an output terminal coupled to said other end of said first conductor, whereby the voltage developed between said output terminal and said first source terminal is proportional to the difference of the impedances of said first impedance means and said second impedance means divided by the sum of the impedance of said first impedance means and said second impedance means.

7. Diode-quad bridge circuit means as recited in claim 6 wherein said first and second impedance means are respectively comprised of the capacitive portions of a differential capacitor.

8. Diode-quad bridge circuit means as recited in claim 7 and further including a resistor coupling said output terminal to said other end of said conductor, and a third capacitor coupling said output terminal to said first source terminal.

9. Diode-quad bridge circuit means as recited in claim 6 wherein said first and second impedance means are comprised of the respective inductive windings of a differential inductor transducer.

10. Diode-quad bridge circuit means as recited in claim 9 and further including a resistor coupling said output terminal to said other end of said first conductor, and a third capacitor coupling said output terminal to said first source terminal.

* * * * *